US012762643B2

(12) United States Patent
Park et al.

(10) Patent No.: US 12,762,643 B2
(45) Date of Patent: Oct. 13, 2026

(54) CAMERA PARAMETER PRECONDITIONING FOR NEURAL RADIANCE FIELDS

(71) Applicant: Google LLC, Mountain View, CA (US)

(72) Inventors: Keunhong Park, San Francisco, CA (US); Ricardo Martin-Brualla, Seattle, WA (US); Jonathan Tilton Barron, Alameda, CA (US); Philipp Henzler, San Francisco, CA (US); Benjamin Joseph Mildenhall, London (GB)

(73) Assignee: GOOGLE LLC, Mountain View, CA (US)

( * ) Notice: Subject to any disclaimer, the term of this patent is extended or adjusted under 35 U.S.C. 154(b) by 375 days.

(21) Appl. No.: 18/502,736

(22) Filed: Nov. 6, 2023

(65) Prior Publication Data

US 2025/0148567 A1 May 8, 2025

(51) Int. Cl.
*G06T 3/06* (2024.01)
*G06T 7/00* (2017.01)

(52) U.S. Cl.
CPC .................. *G06T 3/06* (2024.01); *G06T 7/97* (2017.01); *G06T 2207/20081* (2013.01)

(58) Field of Classification Search
CPC .... G06T 3/06; G06T 7/97; G06T 2207/20081
See application file for complete search history.

(56) References Cited

U.S. PATENT DOCUMENTS

2019/0164312 A1* 5/2019 Sunkavalli ........... G06N 3/0464
2022/0229140 A1* 7/2022 Wang ................. G01R 33/5608
2023/0360372 A1* 11/2023 Zhao ...................... G06V 10/82
2023/0419629 A1* 12/2023 Huang .................... G06T 15/00

OTHER PUBLICATIONS

Park et al. "Camp: Camera preconditioning for neural radiance fields." Acm Transactions on Graphics (TOG) 42.6 (Aug. 2023): 1-11. (Year: 2023).*

(Continued)

*Primary Examiner* — Katrina R Fujita
(74) *Attorney, Agent, or Firm* — DORITY & MANNING, P.A.

(57) ABSTRACT

Systems and methods for training a machine-learned model are disclosed herein. The method can include obtaining, by a processor, a plurality of images, each image having a set of parameter values comprising values for a plurality of camera parameters and determining a covariance matrix for the plurality of camera parameters with respect to a plurality of projected points generated via evaluation of a projection function. The method can also include performing a whitening algorithm to identify a preconditioning matrix that, when applied to the sets of parameter values, results in the covariance matrix being approximately equal to an identity matrix and performing an optimization algorithm on the plurality of sets of parameter values, Performing the optimization algorithm can include applying an inverse of the preconditioning matrix to the plurality of sets of parameters in a forward prediction pass and applying the preconditioning matrix in a backward gradient pass.

20 Claims, 8 Drawing Sheets

(b) CAMERA PARAMETER DECORRELATION (CamP)

(56) References Cited

OTHER PUBLICATIONS

Huang et al. "Normalization techniques in training dnns: Methodology, analysis and application." IEEE transactions on pattern analysis and machine intelligence 45.8 (Aug. 2023): 10173-10196. (Year: 2023).*

Yang et al. "Online extrinsic correction of multi-camera systems by low-dimensional parameterization of physical deformation." 2022 IEEE/RSJ International Conference on Intelligent Robots and Systems (IROS). IEEE, 2022. (Year: 2022).*

* cited by examiner (a) PROXY PROJECTION

CAMERA PARAMETER PRECONDITIONING FOR NEURAL RADIANCE FIELDS

FIELD

The present disclosure relates generally to generating three-dimensional scenes from input two-dimensional images. More particularly, the present disclosure relates to preconditioning camera parameters before generation to obtain higher-quality resulting scenes.

BACKGROUND

Neural radiance fields ("NeRFs") are machine-learned models that can be optimized to obtain high-fidelity, three-dimensional reconstructions and/or novel views of objects and scenes. This is performed by optimizing a continuous volumetric scene function using an input set of views, such as a set of two-dimensional images of the same object and/or scene.

NeRFs can take a set of camera parameters as input. Camera parameters can include intrinsic parameters and extrinsic parameters, such as focal length, lens distortion, camera rotation, and camera translation. Inaccurate camera parameters can result in blurry renderings.

In state-of-the-art approaches, extrinsic and intrinsic camera parameters are generally estimated using various methods as a pre-processing step to NeRF generation, but these techniques do not yield ideal estimates for camera parameters, which can result in lower-quality three-dimensional scene construction.

A limiting factor of NeRF is the assumption that camera parameters for input images are known. Typically, methods such as Structure-from-Motion methods are used to recover camera parameters. However, these methods can be brittle and often fail when given sparse or wide-baseline views or when given images with repeated patterns. Even given hundreds of views of the same scene, incremental reconstruction using these methods may ignore parts of the scene by filtering feature matches that do not align well with the current model.

Given that NeRF models are differentiable image formation models, one can optimize camera parameters jointly alongside the scene structure by simply backpropagating gradients from the loss onto the camera parameters. However, joint recovery of scene and camera parameters is an ill-conditioned optimization problem that can be prone to local minima.

Furthermore, given the large space of possible camera parameterizations for a large number of given camera parameters, it is difficult to select a camera parameterization that is efficient and accurate for both scene and camera estimation, as scene reconstruction affects the estimation of camera parameter estimation and vice versa.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for training a machine-learned model. The method can include obtaining, by a processor, a plurality of images, wherein a plurality of sets of parameter values are respectively associated with the plurality of images, each set of parameter values comprising values for a plurality of camera parameters and determining, by the processor, a covariance matrix for the plurality of camera parameters with respect to a plurality of projected points generated via evaluation of a projection function at the plurality of sets of parameter values. The method can also include performing, by the processor, a whitening algorithm to identify a preconditioning matrix that, when applied to the plurality of sets of parameter values, results in the covariance matrix being approximately equal to an identity matrix and performing, by the processor, an optimization algorithm on the plurality of sets of parameter values, Performing the optimization algorithm can include applying an inverse of the preconditioning matrix to the plurality of sets of parameters in a forward prediction pass and applying the preconditioning matrix in a backward gradient pass.

Another example aspect of the present disclosure is directed to a computing system. The computing system can include a processor and a non-transitory, computer-readable medium that, when executed by the processor, causes the processor to perform operations. The operations can include obtaining a plurality of images, wherein a plurality of sets of parameter values are respectively associated with the plurality of images, each set of parameter values comprising values for a plurality of camera parameters and determining a covariance matrix for the plurality of camera parameters with respect to a plurality of projected points generated via evaluation of a projection function at the plurality of sets of parameter values. The operations can also include performing a whitening algorithm to identify a preconditioning matrix that, when applied to the plurality of sets of parameter values, results in the covariance matrix being approximately equal to an identity matrix and performing an optimization algorithm on the plurality of sets of parameter values. Performing the optimization algorithm can include applying an inverse of the preconditioning matrix to the plurality of sets of parameters in a forward prediction pass and applying the preconditioning matrix in a backward gradient pass.

Another example aspect of the present disclosure is directed to a non-transitory, computer-readable medium that, when executed by a processor, causes the processor to perform operations. The operations can include obtaining a plurality of images, wherein a plurality of sets of parameter values are respectively associated with the plurality of images, each set of parameter values comprising values for a plurality of camera parameters and determining a covariance matrix for the plurality of camera parameters with respect to a plurality of projected points generated via evaluation of a projection function at the plurality of sets of parameter values. The operations can also include performing a whitening algorithm to identify a preconditioning matrix that, when applied to the plurality of sets of parameter values, results in the covariance matrix being approximately equal to an identity matrix and performing an optimization algorithm on the plurality of sets of parameter values. Performing the optimization algorithm can include applying an inverse of the preconditioning matrix to the plurality of sets of parameters in a forward prediction pass and applying the preconditioning matrix in a backward gradient pass.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
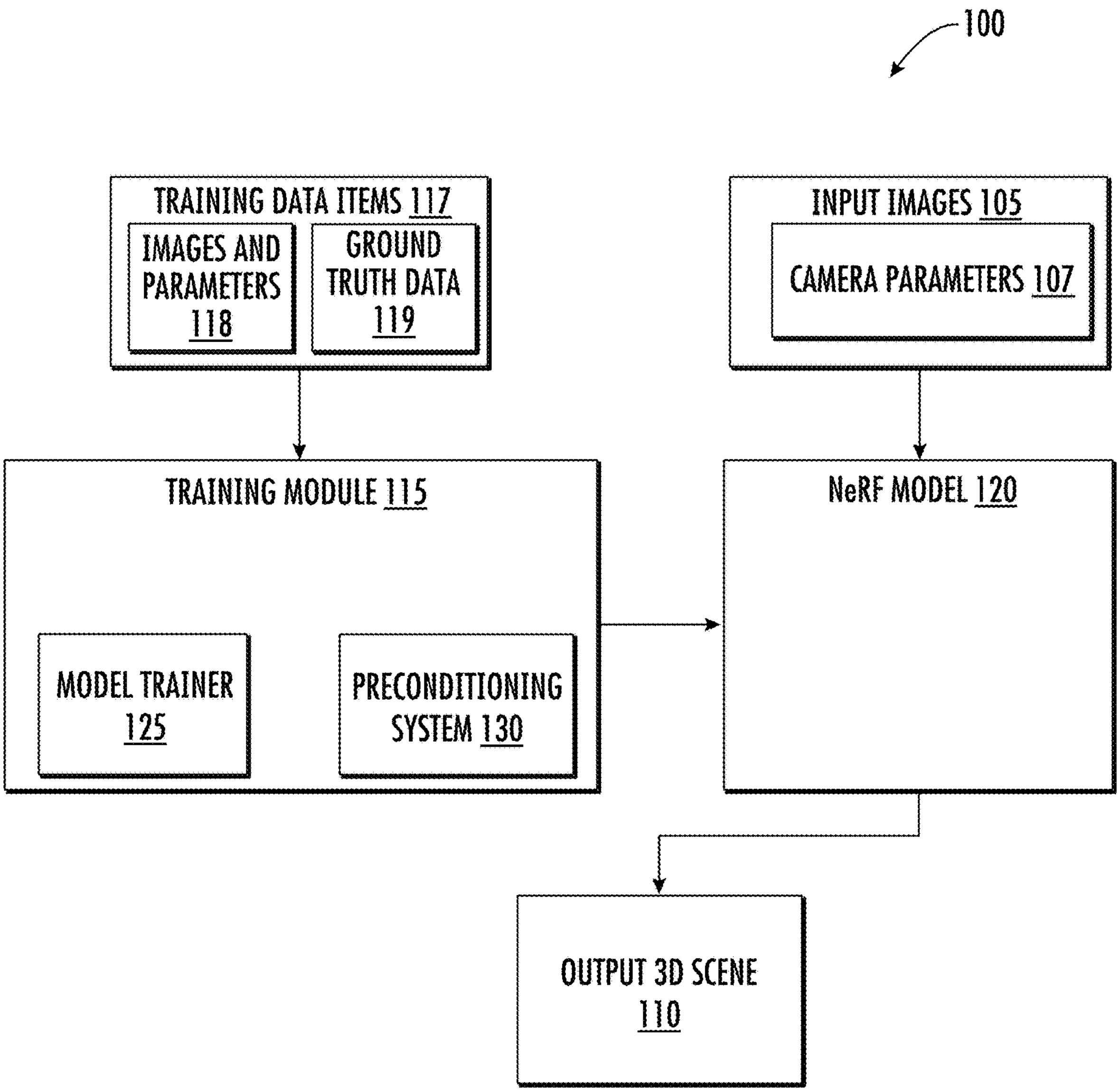
FIG. 1 depicts a block diagram of an example NeRF model according to example embodiments of the present disclosure.

Reference numerals that are repeated across plural figures are intended to identify the same features in various implementations.

DETAILED DESCRIPTION

Overview

Generally, the present disclosure is directed to preconditioning camera parameters before generation to obtain higher-quality resulting scenes and higher quality camera parameter estimates. In particular, proposed embodiments of the present disclosure are generally related to determining a whitening transform to act as a preconditioner for camera parameters during joint optimization of camera parameters and a NeRF model.

More generally, given a set of images and initial camera parameters, a goal of the NeRF model can be to obtain a scene model with optimized NeRF parameters and optimized camera parameters that best reproduce the input images. The NeRF model can be trained by minimizing a loss function over a dataset containing all observed pixels, where each pixel has a camera index, a pixel location, and an RGB color.

The camera parameters can be optimized over the optimization function by optimizing the camera parameters over residual of the current parameters compared to the initial camera parameter values. A projection function that projects a two-dimensional pixel location to a three-dimensional point or ray of points, with a corresponding inverse function that maps rays or points to pixels, can then be defined by the camera parameterization, as the camera parameters are inputs into the projection function.

Preconditioning is a technique where an optimization problem is transformed using a preconditioner into a form that has better optimization characteristics, such as into a problem with a lower condition number. To obtain this optimized form, the optimization problem can be multiplied by a preconditioning matrix, which results in a simplified optimization problem. This simplified optimization problem can be optimized instead of the original optimization problem, resulting in an easier and more straightforward optimization process. Once the optimal value of the simplified optimization problem is found, the optimal value of the simplified optimization problem can be multiplied by an inverse of the preconditioning matrix to obtain an optimal value of the original optimization problem.

In the context of gradient-based optimizers, such as those that can be typically used in NeRF models, a variable, such as a camera parameter, can be preconditioned by optimizing the variable over a preconditioned version of the set of all variables (e.g., the camera parameters) and modifying the optimization objective to be a function of the inverse of a preconditioning matrix multiplied by the preconditioned set of variables.

To re-parameterize the optimization problem for the camera parameters and therefore obtain a preconditioning matrix, a proxy problem can be created. For example, the camera projection function can be augmented and evaluated on a set of two-dimensional points, which are a proxy for a three-dimensional scene being reconstructed. The projection of the two-dimensional points can then be evaluated to determine how the projection changes as a function of each camera parameter. At any given point in the camera parameter space, the effect of each camera parameter on each of the projected points can be represented by a matrix, such as a Jacobian matrix as set forth in Equation 1.

$$\frac{d \prod^{m}}{d\phi} \Big|_{\phi=\phi^{0}} = J \prod \in R^{2mXk} \qquad \text{Equation 1}$$

This matrix can have a diagonal that can indicate the average motion magnitude by varying a particular parameter, and off the diagonal this matrix can indicate how closely correlated the motion is between the particular parameter and another given parameter.

The goal is to find a linear preconditioning matrix such that substituting the linear preconditioning matrix into the projection function results in a result that is equal to the identity matrix. This linear preconditioning matrix, or preconditioner, is optimal for the proxy projection objective for the initial estimate of camera parameters.

This preconditioner can be identified using a whitening function, or whitening transform. Whitening refers to a transformation or function that makes data less redundant and more Gaussian-like. Whitened data has two primary properties: zero mean and identity covariance. After whitening, each feature or variable in the data set can have a mean of zero. Furthermore, the whitened data can have an identity covariance. After whitening, the covariance matrix of the data can become an identity matrix, meaning that all variables are uncorrelated and the variances are equal to one. This preconditioner can then be used during a forward prediction pass in the NeRF model, while its inverse can be used in a backwards gradient pass.

Use of this preconditioner can significantly improve reconstruction quality during training while being easy to implement and without significantly affecting runtime. Additionally, the use of the preconditioner can be applied to a wide variety of camera parameterizations, and can be applied to a variety of models that share certain characteristics with NeRF models.

Therefore, the use of the preconditioner can enable more efficient training of a NeRF model by reducing the number of training cycles needed to create a robust reconstruction and by optimizing the problem of preconditioning, which can require less computing resources because the problem is not as complex to solve. Additionally, the use of the preconditioner can reduce the amount of bandwidth needed to train the NeRF model and can reduce the amount of processing capability needed to train the NeRF model, thus saving computing resources while creating a more optimized NeRF model.

With reference now to the Figures, example embodiments of the present disclosure will be discussed in further detail.

Example Model Arrangements

FIG. 1 depicts a block diagram of an example scene generation system 100 according to example embodiments of the present disclosure.

The scene generation system 100 can utilize a plurality of input images 105 to generate novel views of a three-dimensional scene 110. The scene generation system 100 can include a training system 115 and a NeRF model 120.

The input images 105 can be a plurality of two-dimensional images depicting various views of a scene. The input images 105 can each have a set of parameter values associated with the respective input image. In some embodiments, the sets of parameter values associated with each respective input image can include values for camera parameters 107 associated with a camera that captured the image.

Camera parameters 107 for images can refer to the different properties and configurations of a camera that affect how the camera captures a three-dimensional scene in a two-dimensional. Camera parameters 107 can include intrinsic parameters and extrinsic parameters.

Intrinsic camera parameters can be related to internal characteristics of the camera and can remain constant so long as the camera's internal properties do not change (such as a zoom setting). Intrinsic camera parameters can include focal length (how zoomed the image appears, related to a lens and an image sensor of the camera), principal point (a point where the camera's optical axis intersects the image plane), lens distortion parameters, pixel scaling, and other parameters.

Extrinsic camera parameters can be related to the camera's position and orientation in the environment in which the camera captures images. The extrinsic camera parameters can define how the camera is placed in a three-dimensional space and how the camera is oriented relative to the scene. Extrinsic camera parameters can include a rotation matrix, a translation vector, and other parameters related to a pose and/or six degrees of freedom for the camera.

Together, intrinsic and extrinsic parameters can be used to map three-dimensional points from the captured environment onto two-dimensional points contained within the images in the plurality of images.

In practical applications, these camera parameters 107 are often estimated (instead of measured) and then are optimized to allow a model to predict the two-dimensional points from the known three-dimensional points with minimal error.

Training system 115 can be used to train the NeRF model 120 with a set of optimized parameters for the NeRF model 120 and a set of optimized camera parameters that best reproduce observed images. Model trainer 125 can be used to train the NeRF model 120 by, for example, minimizing a loss function L(D; θ, Φ) over dataset D that contains all observed pixels, where pixel j has a camera index $d_j \in (1, \ldots,)$, a pixel location $p_j$, and an RGB color $c_j$. A camera parameterization function can also be determined. The camera parameterization function can project a three-dimensional point x to a two-dimensional pixel location p, with a corresponding inverse camera parameterization function that maps pixels to points. In some embodiments, the inverse camera parameterization function can utilize a pixel depth value d to map the pixel to its corresponding three-dimensional point.

The model trainer 125 can optimize the parameters for the NeRF model 120 and the optimized camera parameters jointly by, for example, optimizing over a linearized version of an optimization problem $\Phi=\Phi^0+\Delta\Phi$, which optimizes over the residual of the camera parameters $\Delta\Phi$ with regards to the initial camera parameter values $\Phi^0$. To train the NeRF model 120, the model trainer 125 can use training data items 117 as input. The training data items 117 can include training images and associated parameters 118 and ground truth data 119. The training images and associated parameters 118 can be input into the NeRF model 120, which can process the training images and associated parameters 118 to obtain a generated three-dimensional output, such as three-dimensional scene 110. This output is then compared to the ground truth data 119 to determine a difference between the output and the ground truth data 119. This difference can then be used in a loss function to train the NeRF model 120 to more accurately create three-dimensional scenes from input images.

The training system 115 can also include a preconditioning system 130, which can perform preconditioning on one or more parameters of the NeRF model 120, including the camera parameters of the NeRF model 120.

Preconditioning is a technique where an optimization problem for a model can be transformed using a preconditioner into a form that has better optimization characteristics. Optimization characteristics can include, for example, an optimization function to be minimized or maximized and one or more constraints on the optimization function. Optimization characteristics can also include a condition number, which can measure how much an output value of the optimization function can change in response to a corresponding smaller change in the input. In some embodiments, the preconditioning module 130 can transform the optimization problem for the NeRF model 120 into a form with a lower condition number (e.g., a smaller change in output based on change in input).

To precondition the NeRF model 120, a preconditioning matrix can be determined. When optimizing a value $u \in R^k$ to minimize $f(u):R^n \rightarrow R$ (an example optimization function for the NeRF model 100), a preconditioning matrix P with dimensions k×k can be used to determine a "proxy" optimization problem by computing v=Pu, where u is the original value being optimized and v is the proxy problem to be optimized. In some embodiments, the proxy problem to be optimized can be $f(P^{-1}v)$ instead of the original $f(u)$: $R^n \rightarrow R$. Once an optimal value v* is found, the optimal value for u can be found using $u^*=P^{-1}v^*$.

To precondition the camera parameters, the sensitivity of the camera projection function is compared to the input camera parameters. The camera projection function can be augmented to $\pi^m(\Phi):R^k \rightarrow R^{2m}$, which is a concatenation of the camera projection function evaluated on m points. This set of points can be considered the proxy for the three-dimensional scene content being reconstructed, with the goal of measuring how the two-dimensional projections of these points change as a function of each camera parameter.

Figure 2:
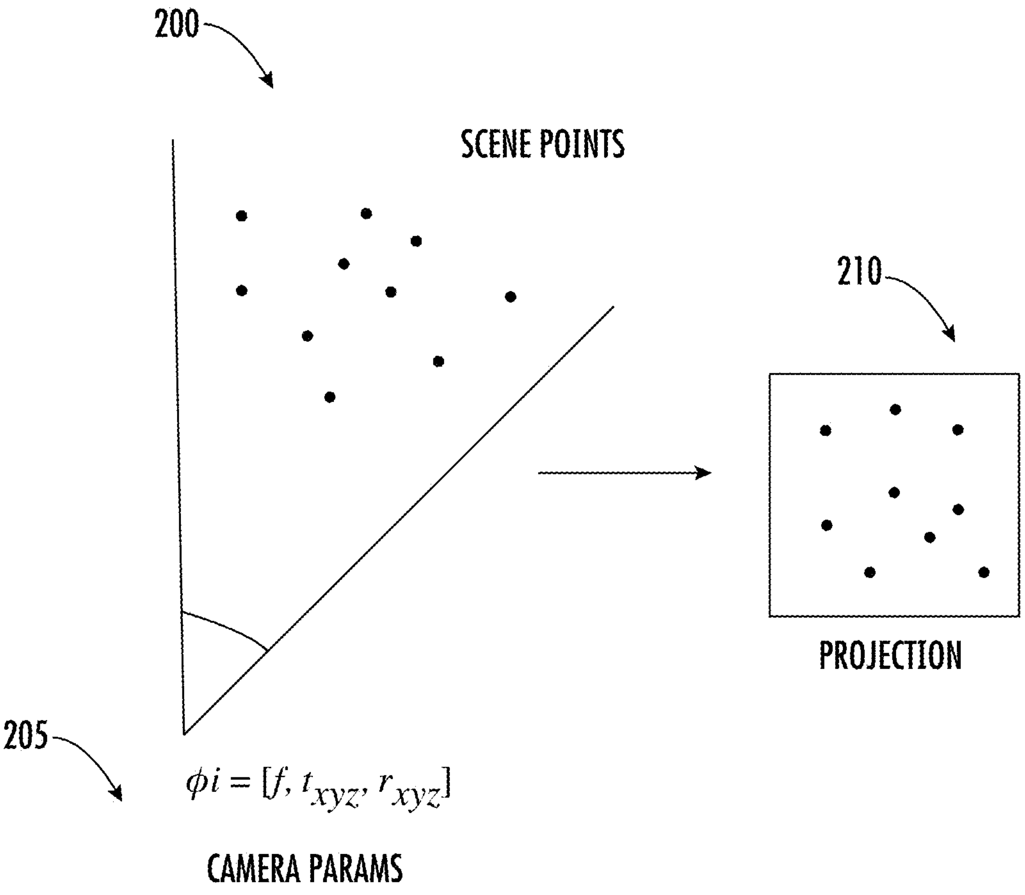
FIG. 2 depicts a projection of points according to example embodiments of the present disclosure.

This projection of points is illustrated in FIG. 2. Scene points 200 with associated camera parameters 205 are projected by the camera projection function into two-dimensional projection 210.

Returning now to FIG. 1, preconditioning system 130 can represent the effect of each camera parameter on each of the projection points using Equation 1:

$$\frac{d\Pi^m}{d\phi}\Big|_{\phi=\phi^0} = J_\Pi \in$$

$R^{2m\times k}$. In some embodiments, this effect is a Jacobian matrix and is the covariance matrix of the camera parameters. This Jacobian matrix $\Sigma_\pi J_\pi^T J_\pi \in R^{k\times k}$ has an rs-th entry equal to $$\sum_{l=1}^{m}\left(\frac{dP_l}{d\phi[r]}\right)^T\left(\frac{dP_l}{d\phi[s]}\right).$$

On the diagonal, this equation describes the average motion magnitude induced by varying the r-th camera parameter $\phi[r]$, and off the diagonal this equation describes how closely correlated motion is between camera parameters $\phi[r]$ and $\phi[s]$.

The goal of the preconditioning system 130 is to obtain a linear preconditioning matrix P such that substituting $P^{-1}\hat{\phi}=\phi$ into the camera projection function results in a Jacobian matrix that is equal to the identity matrix $I_k$. There can be infinitely many solutions that satisfy this condition. Therefore, a whitening algorithm or whitening transform can be chosen.

Whitening refers to a transformation that can make data less redundant and more Gaussian in nature. Whitened data can have two distinct primary properties: a zero mean and an identity covariance. Zero mean can indicate that each feature or variable in a data set that has been whitened has a mean of zero. Identity covariance can indicate that the covariance matrix of the data becomes an identity matrix, which can indicate that all variables are uncorrelated and their variances are equal to one.

Various methods can be used to perform the whitening transformation. For example, principal component analysis ("PCA"), zero component analysis ("ZCA"), canonical correlation analysis ("CCA"), and other whitening transformations can be used. Whitening transformations can be useful as a preprocessing step for parameters because convergence rates and performance can be improved. By making the input features less redundant and more Gaussian-like, algorithms can have an easier time identifying patterns and relationships in the data.

Regardless of the whitening transformation selected, the preconditioning module 130 can perform the whitening transform on the covariance matrix to obtain the preconditioning matrix, or preconditioner.

Figure 3:
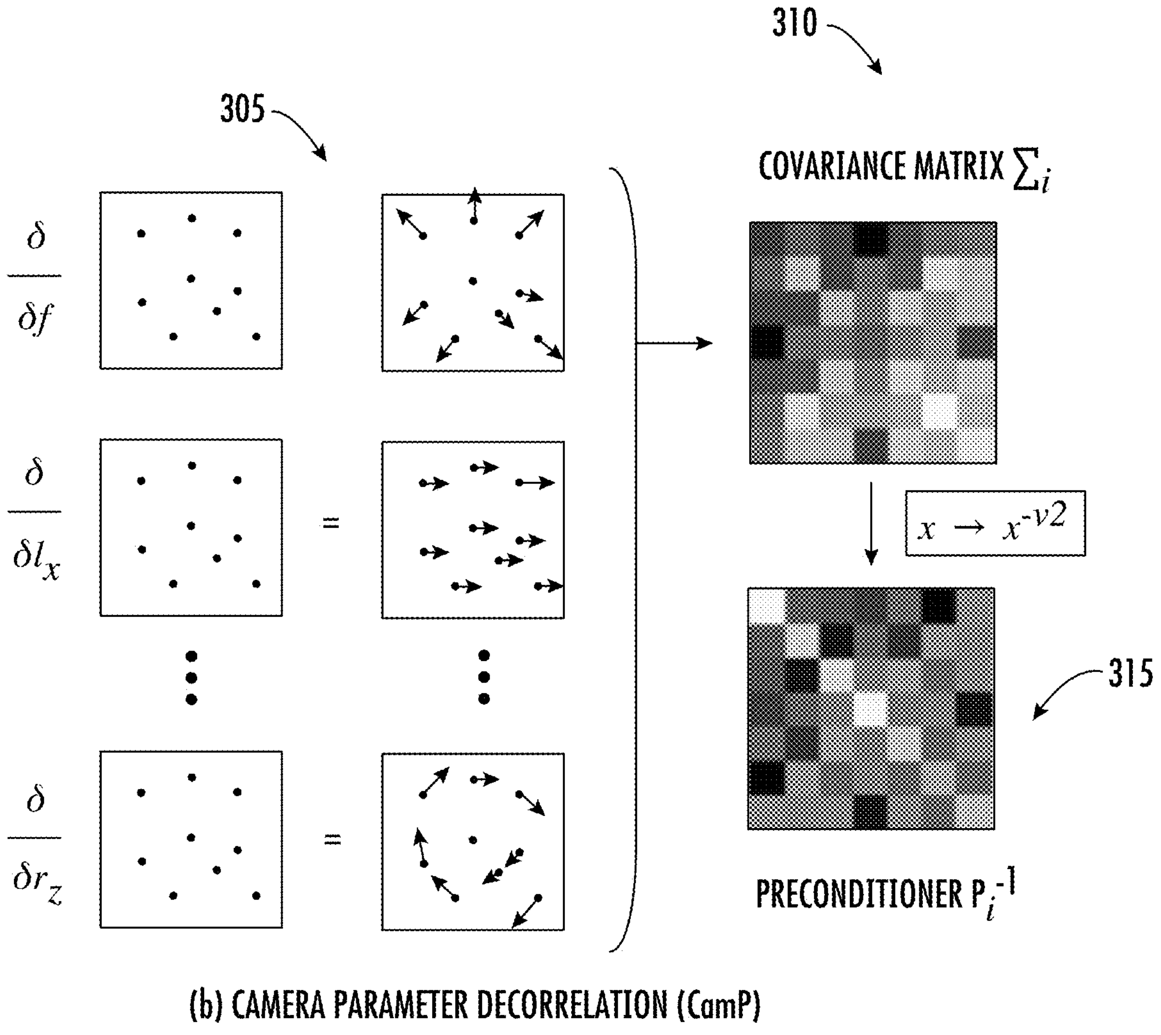
FIG. 3 depicts obtaining of a covariance matrix for camera parameters and the conversion of the covariance matrix to a preconditioner according to example embodiments of the present disclosure.

This obtaining of the covariance matrix for the camera parameters and the conversion of the covariance matrix to the preconditioner is illustrated in FIG. 3. Camera parameters 305 are processed to generate covariance matrix 310, which then undergoes a whitening transformation/algorithm to obtain the preconditioner 315, which decorrelates the camera parameters.

Returning to FIG. 1, in some embodiments, it can be assumed that cameras are parameterized independently from one another. In other words, it can be assumed that different cameras can capture each image in a plurality of images. However, in many reconstruction settings, all images can be taken with the same camera and lens, which means that each set of camera parameters includes the same intrinsic camera parameters. This can be accounted for by including an additional $L_{shared}$ term in the optimization function that minimizes the variance of shared intrinsic parameters.

In some embodiments, a dampening parameter can be included in one or more diagonals of the covariance matrix in order to better condition the matrix before obtaining the preconditioning matrix by, for example, taking the inverse matrix square root of the covariance matrix. This dampening parameter can be included in the preconditioner as one or more hyperparameters, such as hyperparameters $\lambda$ and $\mu$ in $P^{-1}=(\Sigma_\pi+(\lambda \mathrm{diag}(\Sigma_\pi)+\mu I)^{-1/2}$. The addition of the dampening parameter can be especially important when including lens distortion parameters in the plurality of camera parameters, as small changes in the lens distortion parameters can cause dramatic changes to point projection.

Figure 4:
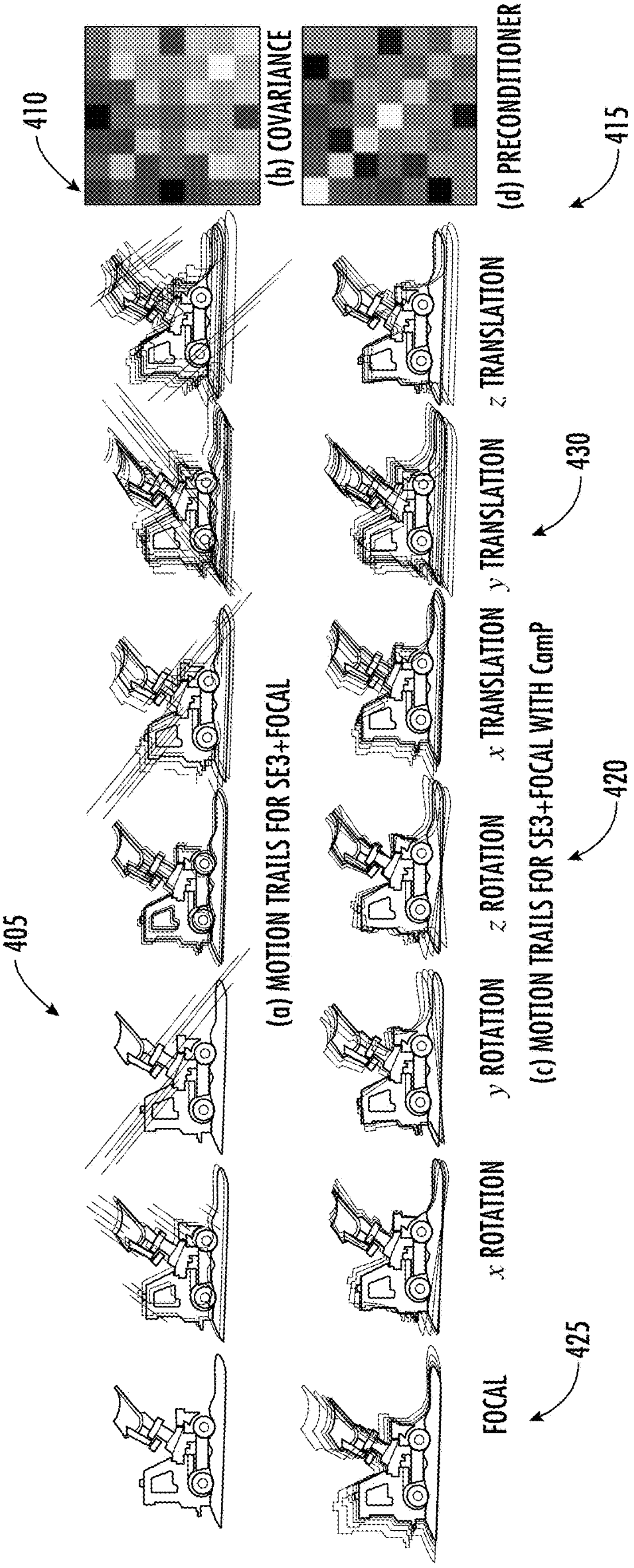
FIG. 4 depicts effects of different camera parameters and the resulting covariance matrix and preconditioner according to example embodiments of the present disclosure.

The effects of different camera parameters and the resulting covariance matrix and preconditioner is shown in FIG. 4. Motion trails 405 are affected by various camera parameters. A covariance matrix 410 is obtained for these parameters. Preconditioner 415 is obtained by processing the covariance matrix with a whitening algorithm. Then, the preconditioner is applied to the initial camera parameters to obtain the preconditioned motion trails 420. In the preconditioned motion trails 420, the preconditioner 415 has increased a magnitude of a focal length camera parameter 425 and decreased a magnitude of a y-translation camera parameter 430 such that the preconditioned motion trails 420 exhibit more similar motion magnitudes.

Returning to FIG. 1, once the preconditioning system 130 has determined the covariance matrix and the preconditioning matrix, the preconditioning matrix can be applied to camera parameters of the training data items 117 during training of the NeRF model 120. For example, during a forward pass of training, such as performing the proxy optimization problem, the preconditioning matrix can be applied to the camera parameters. In a backwards gradient pass of training, an inverse of the preconditioning matrix can be applied to the camera parameters. This is equivalent to performing the original optimization problem. For example, the camera parameters can be represented by a vector and the vector can be multiplied by the preconditioning matrix before inputting the vector into the optimization problem.

Example Methods

Figure 5:
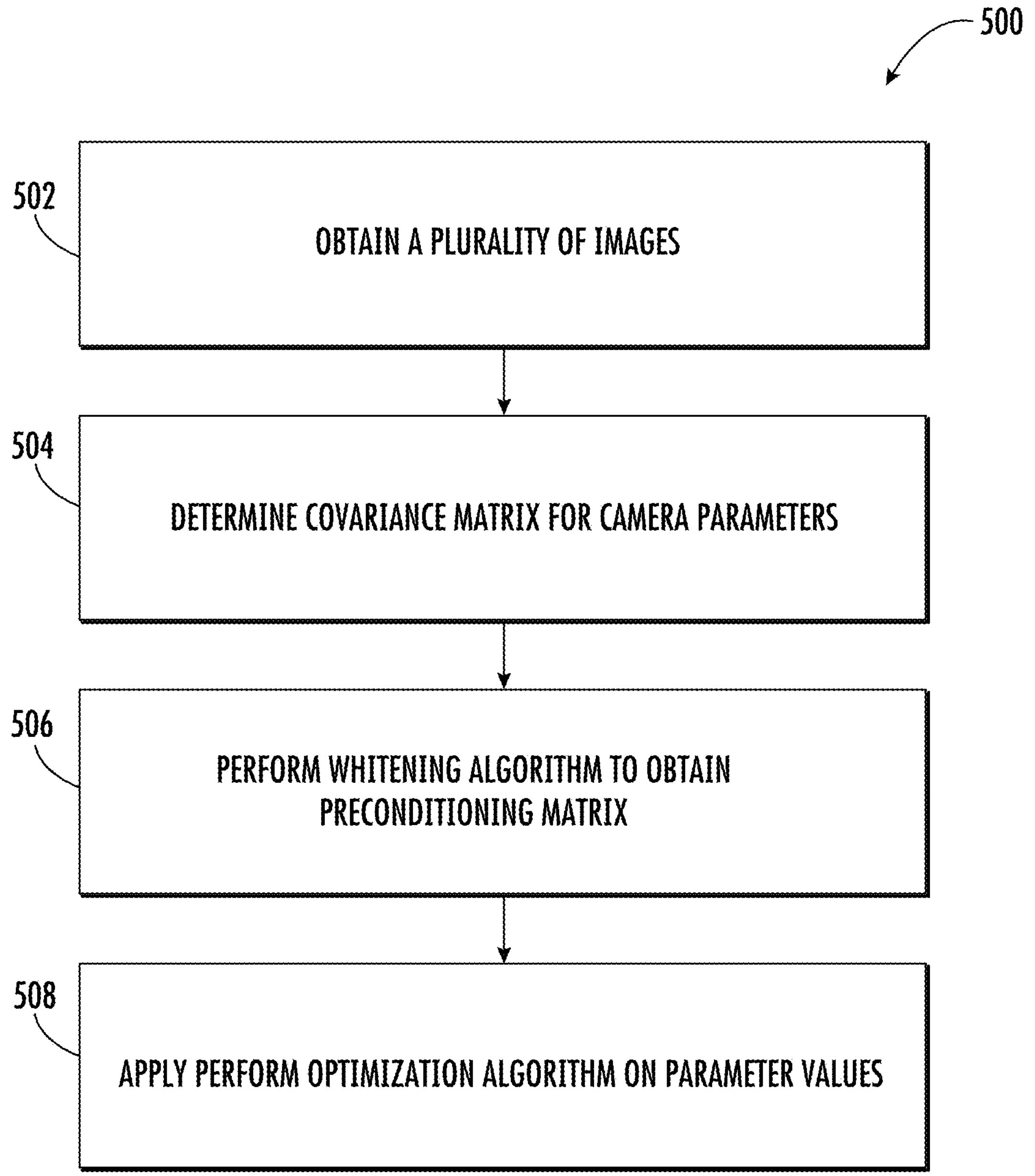
FIG. 5 depicts a flow chart diagram of an example method to perform training of a NeRF model according to example embodiments of the present disclosure.

FIG. 5 depicts a flow chart diagram of an example method 500 to perform training of a NeRF model according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can obtain a plurality of images, wherein a plurality of sets of parameter values are respectively associated with the plurality of images, each set of parameter values comprising values for a plurality of camera parameters.

In some embodiments, the plurality of camera parameters can include at least one of an intrinsic parameter and an extrinsic parameter associated with a camera.

In some embodiments, two or more sets of parameter values can share at least one intrinsic parameter value of the plurality of camera parameters.

In some embodiments, the at least one intrinsic parameter value shared by the two or more sets of parameter values can represented by an additional loss term in an optimization algorithm.

At 504, the computing system can determine a covariance matrix for the plurality of camera parameters with respect to a plurality of projected points generated via evaluation of a projection function at the plurality of sets of parameter values.

In some embodiments, at least one diagonal of the covariance matrix can represent an average motion magnitude induced by varying a first parameter of the plurality of camera parameters.

In some embodiments, at least one value not on a diagonal in the covariance matrix can represent a correlation of motion between a first camera parameter and a second camera parameter.

In some embodiments, the covariance matrix can include a dampening parameter. In some embodiments, the dampening parameter can be included on at least one diagonal of the covariance matrix.

At 506, the computing system can perform a whitening algorithm to identify a preconditioning matrix that, when applied to the plurality of sets of parameter values, results in the covariance matrix being approximately equal to an identity matrix.

In some embodiments, the whitening algorithm can be a whitening algorithm selected from a group of whitening algorithms that can include principal component analysis, zero component analysis, and canonical correlation analysis.

At 508, the computing system can perform an optimization algorithm on the plurality of sets of parameter values. Performing the optimization algorithm can include applying an inverse of the preconditioning matrix to the plurality of sets of parameters in a forward prediction pass. Performing the optimization algorithm can also include applying the preconditioning matrix in a backward gradient pass.

Example Devices and Systems

Figure 6A:
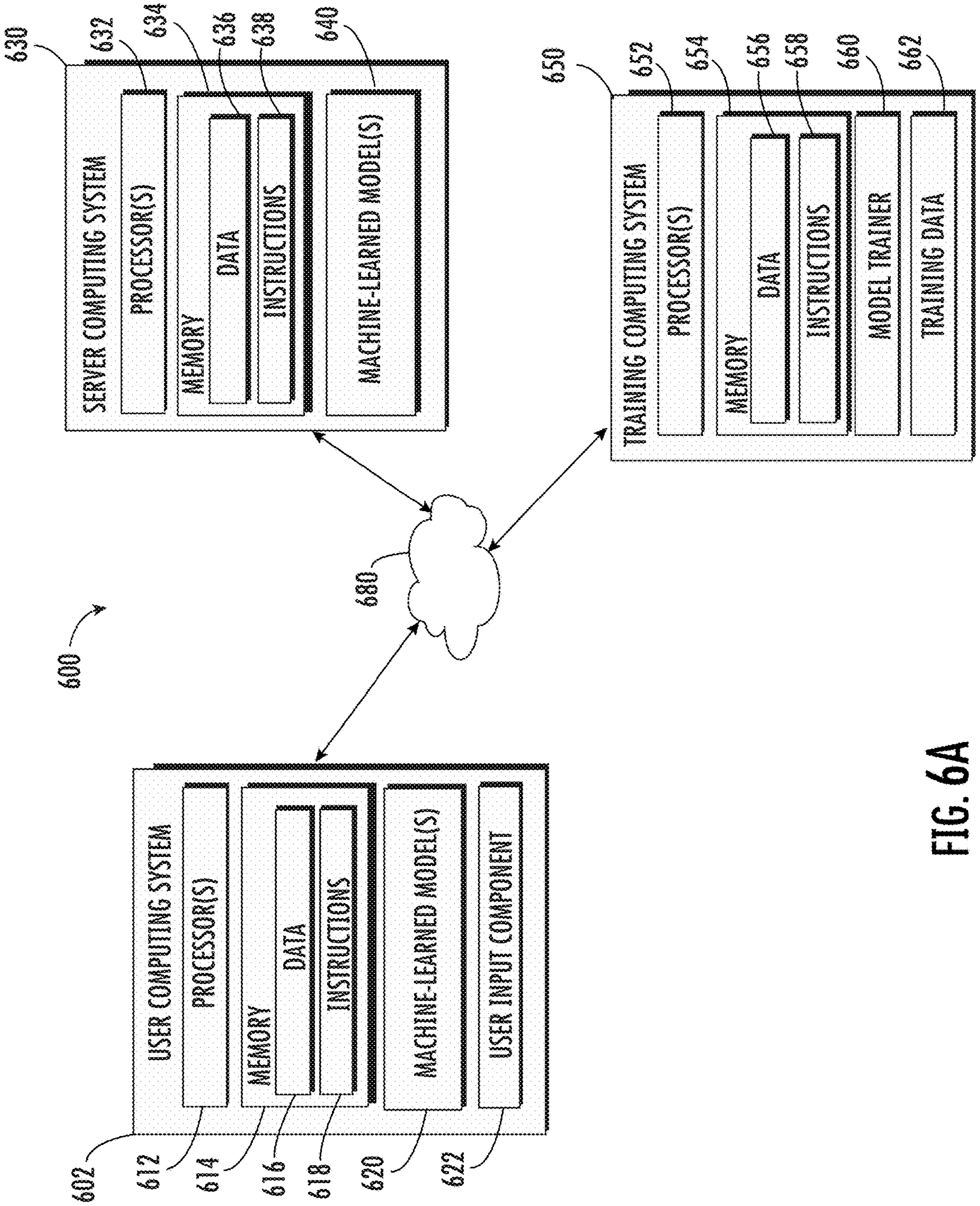
FIG. 6A depicts a block diagram of an example computing system that performs scene generation according to example embodiments of the present disclosure.

FIG. 6A depicts a block diagram of an example computing system 600 that performs three-dimensional scene generation according to example embodiments of the present disclosure. The system 600 includes a user computing device 602, a server computing system 630, and a training computing system 650 that are communicatively coupled over a network 680.

The user computing device 602 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 602 includes one or more processors 612 and a memory 614. The one or more processors 612 can be any suitable processing device (e.g., a processor core, a microprocessor, an ASIC, an FPGA, a controller, a microcontroller, etc.) and can be one processor or a plurality of processors that are operatively connected. The memory 614 can include one or more non-transitory computer-readable storage media, such as RAM, ROM, EEPROM, EPROM, flash memory devices, magnetic disks, etc., and combinations thereof. The memory 614 can store data 616 and instructions 618 which are executed by the processor 612 to cause the user computing device 602 to perform operations.

In some implementations, the user computing device 602 can store or include one or more NeRF models 620. For example, the NeRF models 620 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example NeRF models 620 are discussed with reference to FIG. 1.

In some implementations, the one or more NeRF models 620 can be received from the server computing system 630 over network 680, stored in the user computing device memory 614, and then used or otherwise implemented by the one or more processors 612. In some implementations, the user computing device 602 can implement multiple parallel instances of a single NeRF model 620 (e.g., to perform parallel scene generation).

More particularly, the one or more NeRF models 620 can be used to generate novel views of three-dimensional scenes. Based on a plurality of input images and associated parameters, the one or more NeRF models 620 can create a three-dimensional view of the scene depicted by the plurality of input images.

Additionally or alternatively, one or more NeRF models 640 can be included in or otherwise stored and implemented by the server computing system 630 that communicates with the user computing device 602 according to a client-server relationship. For example, the NeRF models 640 can be implemented by the server computing system 640 as a portion of a web service (e.g., a scene generation service). Thus, one or more models 620 can be stored and implemented at the user computing device 602 and/or one or more models 640 can be stored and implemented at the server computing system 630.

The user computing device 602 can also include one or more user input components 622 that receives user input. For example, the user input component 622 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 630 includes one or more processors 632 and a memory 634. The one or more processors 632 can be any suitable processing device (e.g., a processor core, a microprocessor, an ASIC, an FPGA, a controller, a microcontroller, etc.) and can be one processor or a plurality of processors that are operatively connected. The memory 634 can include one or more non-transitory computer-readable storage media, such as RAM, ROM, EEPROM, EPROM, flash memory devices, magnetic disks, etc., and combinations thereof. The memory 634 can store data 636 and instructions 638 which are executed by the processor 632 to cause the server computing system 630 to perform operations.

In some implementations, the server computing system 630 includes or is otherwise implemented by one or more server computing devices. In instances in which the server computing system 630 includes plural server computing devices, such server computing devices can operate according to sequential computing architectures, parallel computing architectures, or some combination thereof.

As described above, the server computing system 630 can store or otherwise include one or more NeRF models 640. For example, the models 640 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 640 are discussed with reference to FIG. 1.

The user computing device 602 and/or the server computing system 630 can train the models 620 and/or 640 via interaction with the training computing system 650 that is communicatively coupled over the network 680. The training computing system 650 can be separate from the server computing system 630 or can be a portion of the server computing system 630.

The training computing system 650 includes one or more processors 652 and a memory 654. The one or more processors 652 can be any suitable processing device (e.g., a processor core, a microprocessor, an ASIC, an FPGA, a controller, a microcontroller, etc.) and can be one processor or a plurality of processors that are operatively connected. The memory 654 can include one or more non-transitory computer-readable storage media, such as RAM, ROM, EEPROM, EPROM, flash memory devices, magnetic disks, etc., and combinations thereof. The memory 654 can store data 656 and instructions 658 which are executed by the processor 652 to cause the training computing system 650 to perform operations. In some implementations, the training computing system 650 includes or is otherwise implemented by one or more server computing devices.

The training computing system 650 can include a model trainer 660 that trains the machine-learned models 620 and/or 640 stored at the user computing device 602 and/or the server computing system 630 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 660 can perform a number of generalization techniques (e.g., weight decays, dropouts, etc.) to improve the generalization capability of the models being trained.

In particular, the model trainer 660 can train the NeRF models 620 and/or 640 based on a set of training data 662. The training data 662 can include, for example, training images and associated parameters and ground truth data. The training images and associated parameters can be input into the models 620 and/or 640, which can process the training images and associated parameters to obtain a generated three-dimensional output. This output is then compared to the ground truth data to determine a difference between the output and the ground truth data. This difference can then be used in a loss function to train the models 620 and/or 640 to more accurately create three-dimensional scenes from input images.

In some implementations, if the user has provided consent, the training examples can be provided by the user computing device 602. Thus, in such implementations, the model 620 provided to the user computing device 602 can be trained by the training computing system 650 on user-specific data received from the user computing device 602. In some instances, this process can be referred to as personalizing the model.

The model trainer 660 includes computer logic utilized to provide desired functionality. The model trainer 660 can be implemented in hardware, firmware, and/or software controlling a general purpose processor. For example, in some implementations, the model trainer 660 includes program files stored on a storage device, loaded into a memory and executed by one or more processors. In other implementations, the model trainer 660 includes one or more sets of computer-executable instructions that are stored in a tangible computer-readable storage medium such as RAM, hard disk, or optical or magnetic media.

The network 680 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 6A illustrates one example computing system that can be used to implement the present disclosure. Other computing systems can be used as well. For example, in some implementations, the user computing device 602 can include the model trainer 660 and the training dataset 662. In such implementations, the models 620 can be both trained and used locally at the user computing device 602. In some of such implementations, the user computing device 602 can implement the model trainer 660 to personalize the models 620 based on user-specific data.

Figure 6B:
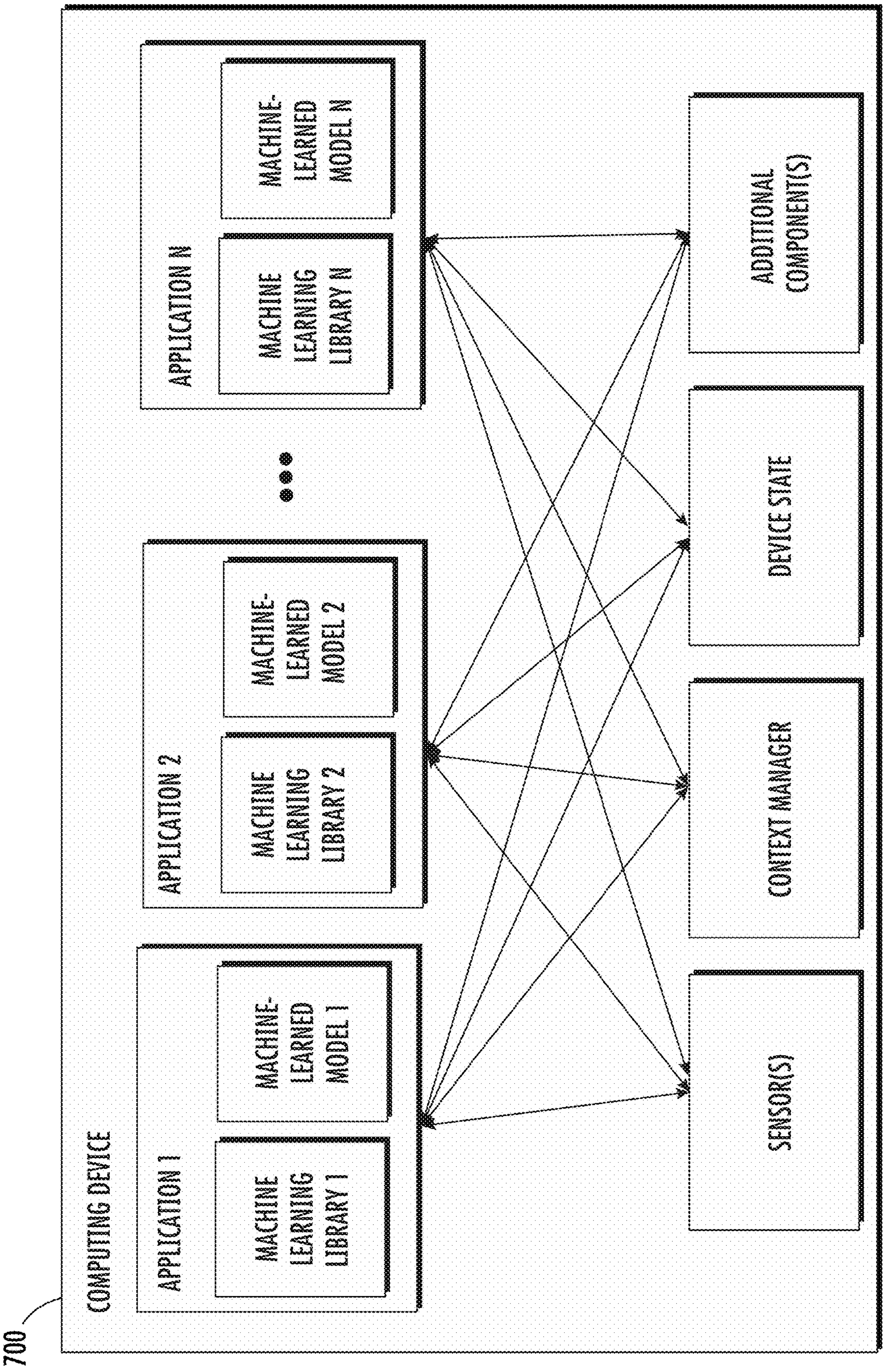
FIG. 6B depicts a block diagram of an example computing device that performs scene generation according to example embodiments of the present disclosure.

FIG. 6B depicts a block diagram of an example computing device 700 that performs according to example embodiments of the present disclosure. The computing device 700 can be a user computing device or a server computing device.

The computing device 700 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 6B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6C:
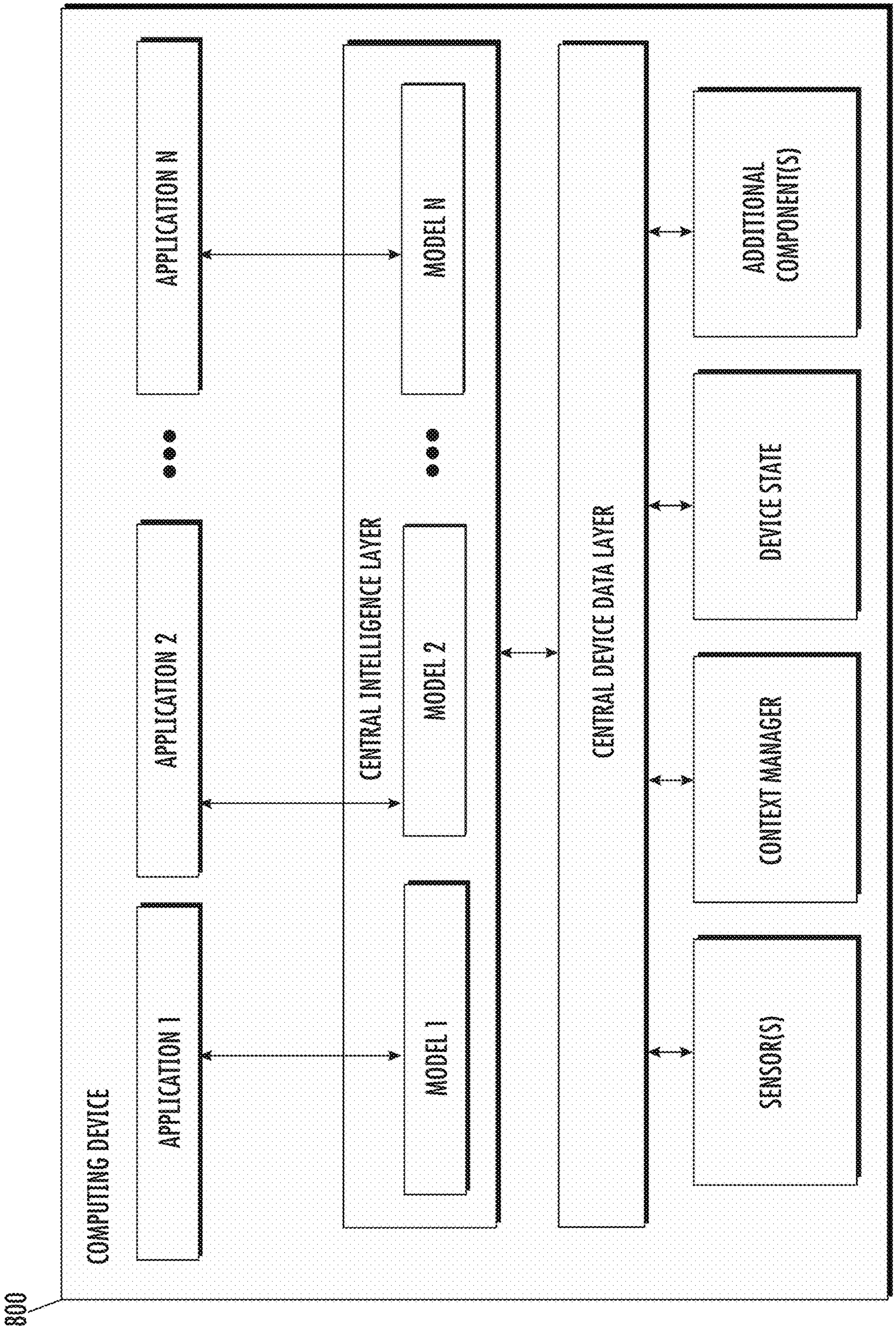
FIG. 6C depicts a block diagram of an example computing device that performs scene generation according to example embodiments of the present disclosure.

FIG. 6C depicts a block diagram of an example computing device 800 that performs according to example embodiments of the present disclosure. The computing device 800 can be a user computing device or a server computing device.

The computing device 800 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 800.

The central intelligence layer can communicate with a central device data layer. The central device data layer can be a centralized repository of data for the computing device 800. As illustrated in FIG. 6C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for training a machine-learned model, the method comprising:

obtaining, by a processor, a plurality of images, wherein a plurality of sets of parameter values are respectively associated with the plurality of images, each set of parameter values comprising values for a plurality of camera parameters;

determining, by the processor, a covariance matrix for the plurality of camera parameters with respect to a plurality of projected points generated via evaluation of a projection function at the plurality of sets of parameter values;

performing, by the processor, a whitening algorithm to identify a preconditioning matrix that, when applied to the plurality of sets of parameter values, results in the covariance matrix being approximately equal to an identity matrix; and performing, by the processor, an optimization algorithm on the plurality of sets of parameter values, wherein performing the optimization algorithm comprises:

applying an inverse of the preconditioning matrix to the plurality of sets of parameters in a forward prediction pass; and applying the preconditioning matrix in a backward gradient pass.

2. The computer-implemented method of claim 1, wherein the plurality of camera parameters includes at least one of an intrinsic parameter and an extrinsic parameter.

3. The computer-implemented method of claim 2, wherein two or more sets of parameter values share at least one intrinsic parameter value of the plurality of camera parameters.

4. The computer-implemented method of claim 3, wherein the at least one intrinsic parameter value shared by the two or more sets of parameter values is represented by an additional loss term in the optimization algorithm.

5. The computer-implemented method of claim 1, wherein the whitening algorithm is a whitening algorithm selected from a group of whitening algorithms consisting of principal component analysis, zero component analysis, and canonical correlation analysis.

6. The computer-implemented method of claim 1, wherein at least one diagonal of the covariance matrix represents an average motion magnitude induced by varying a first parameter of the plurality of camera parameters.

7. The computer-implemented method of claim 1, wherein at least one value not on a diagonal in the covariance matrix represents a correlation of motion between a first camera parameter and a second camera parameter.

8. The computer-implemented method of claim 1, wherein the covariance matrix includes a dampening parameter.

9. The computer-implemented method of claim 8, wherein the dampening parameter is included on at least one diagonal of the covariance matrix.

10. A computing system, comprising:

a processor; and a non-transitory, computer-readable medium that, when executed by the processor, causes the processor to perform operations, the operations comprising:

obtaining a plurality of images, wherein a plurality of sets of parameter values are respectively associated with the plurality of images, each set of parameter values comprising values for a plurality of camera parameters;

determining a covariance matrix for the plurality of camera parameters with respect to a plurality of projected points generated via evaluation of a projection function at the plurality of sets of parameter values;

performing a whitening algorithm to identify a preconditioning matrix that, when applied to the plurality of sets of parameter values, results in the covariance matrix being approximately equal to an identity matrix; and performing an optimization algorithm on the plurality of sets of parameter values, wherein performing the optimization algorithm comprises:

applying an inverse of the preconditioning matrix to the plurality of sets of parameters in a forward prediction pass; and applying the preconditioning matrix in a backward gradient pass.

11. The computing system of claim 10, wherein the plurality of camera parameters includes at least one of an intrinsic parameter and an extrinsic parameter.

12. The computing system of claim 11, wherein two or more sets of parameter values share at least one intrinsic parameter value of the plurality of camera parameters.

13. The computing system of claim 12, wherein the at least one intrinsic parameter value shared by the two or more sets of parameter values is represented by an additional loss term in the optimization algorithm.

14. The computing system of claim 10, wherein the whitening algorithm is a whitening algorithm selected from a group of whitening algorithms consisting of principal component analysis, zero component analysis, and canonical correlation analysis.

15. The computing system of claim 10, wherein at least one diagonal of the covariance matrix represents an average motion magnitude induced by varying a first parameter of the plurality of camera parameters.

16. The computing system of claim 10, wherein at least one value not on a diagonal in the covariance matrix represents a correlation of motion between a first camera parameter and a second camera parameter.

17. The computing system of claim 10, wherein the covariance matrix includes a dampening parameter.

18. The computing system of claim 17, wherein the dampening parameter is included on at least one diagonal of the covariance matrix.

19. A non-transitory, computer-readable medium that, when executed by a processor, causes the processor to perform operations, the operations comprising:

obtaining a plurality of images, wherein a plurality of sets of parameter values are respectively associated with the plurality of images, each set of parameter values comprising values for a plurality of camera parameters;

determining a covariance matrix for the plurality of camera parameters with respect to a plurality of projected points generated via evaluation of a projection function at the plurality of sets of parameter values;

performing a whitening algorithm to identify a preconditioning matrix that, when applied to the plurality of sets of parameter values, results in the covariance matrix being approximately equal to an identity matrix; and performing an optimization algorithm on the plurality of sets of parameter values, wherein performing the optimization algorithm comprises:

applying an inverse of the preconditioning matrix to the plurality of sets of parameters in a forward prediction pass; and applying the preconditioning matrix in a backward gradient pass.

20. The non-transitory, computer-readable medium of claim 19, wherein the covariance matrix includes a dampening parameter.

* * * * *